United States Patent
Colwell

[11] Patent Number: 5,375,651
[45] Date of Patent: Dec. 27, 1994

[54] DRAFT INDUCER BLOWER MOTOR MOUNTING AND COOLING CONSTRUCTION

[75] Inventor: Robert A. Colwell, Owosso, Mich.

[73] Assignee: Magnetek Universal Electric, Owosso, Mich.

[21] Appl. No.: 108,826

[22] Filed: Aug. 18, 1993

Related U.S. Application Data

[63] Continuation of Ser. No. 679,799, Apr. 3, 1991, abandoned.

[51] Int. Cl.$^5$ ............................................. F23L 17/00
[52] U.S. Cl. .................................... 165/47; 417/368; 417/423.2; 417/423.8; 110/162; 454/16; 454/18; 310/89; 415/214.1
[58] Field of Search ............................. 165/47; 310/89; 415/214.1; 417/423.8, 423.2, 368; 126/312; 431/20; 454/16, 18; 110/162

[56] References Cited

U.S. PATENT DOCUMENTS

| | | | |
|---|---|---|---|
| 1,064,412 | 6/1913 | White | 417/368 |
| 2,021,298 | 11/1935 | Fosberg | 417/423.2 |
| 2,049,603 | 8/1936 | Dietenberger | 417/423.2 |
| 2,188,741 | 1/1940 | Roberts | 454/16 |
| 2,242,278 | 5/1941 | Yonkers, Jr. | 417/423.2 |
| 2,244,165 | 6/1941 | MacFarland et al. | 417/423.2 |
| 2,658,665 | 11/1953 | Tschudy | 417/423.2 |
| 2,694,157 | 11/1954 | Cone | 310/89 |
| 2,726,033 | 12/1955 | Sheahan | 417/423.2 |
| 2,726,807 | 12/1955 | Lewis | 417/423.2 |
| 3,040,668 | 6/1962 | Keller | 417/423.2 |
| 3,170,621 | 2/1965 | Morrison | 417/368 |
| 3,403,962 | 10/1968 | Suffron et al. | 431/20 |
| 3,572,964 | 3/1971 | Dyer | 415/214.1 |
| 3,580,588 | 5/1971 | Allen | 415/214.1 |
| 3,653,785 | 4/1972 | Dahlgren et al. | 165/47 |
| 3,730,642 | 5/1973 | Barnstead et al. | 417/423.2 |
| 3,732,616 | 5/1973 | Masrrodonato et al. | 310/89 |
| 3,782,303 | 1/1974 | Pfister et al. | 126/312 |
| 3,875,436 | 4/1975 | MacFarland | 310/89 |
| 4,236,443 | 2/1980 | Schossow | 454/18 |
| 4,344,370 | 8/1982 | Smith et al. | 110/162 |
| 4,689,507 | 8/1987 | Baker et al. | 310/89 |
| 4,865,517 | 9/1989 | Beehler | 415/214.1 |
| 4,922,889 | 5/1990 | Nuesmeyer et al. | 126/312 |
| 5,040,943 | 8/1991 | Dwyer et al. | 417/423.8 |
| 5,070,772 | 12/1991 | Guzorek | 110/162 |

FOREIGN PATENT DOCUMENTS

| | | | |
|---|---|---|---|
| 505227 | 12/1952 | Belgium | 417/423.8 |
| 624126 | 10/1962 | Belgium | 110/162 |
| 654160 | 12/1962 | Canada | 417/423.8 |
| 53703 | 6/1982 | European Pat. Off. | 110/162 |
| 584287 | 10/1958 | Italy | 110/162 |
| 238213 | 9/1990 | Japan | 454/16 |
| 1328754 | 9/1973 | United Kingdom | 417/368 |

*Primary Examiner*—John K. Ford
*Attorney, Agent, or Firm*—Barnes, Kisselle, Raisch, Choate, Whittemore & Hulbert

[57] ABSTRACT

A draft inducer blower motor mounting and cooling construction comprising an electric motor including a housing having openings therein and a rotor mounted on a shaft, a fan blade fixed on the shaft and interposed between the motor and the draft inducer blower, and a heat shield interposed between the motor housing and the fan blade. The heat shield is fastened to the electric motor and to the housing of the inducer blower and has portions spaced from the blower housing. The heat shield further preferably includes a portion surrounding at least a part of the motor housing such that rotation of the fan blade draws cooling air through the electrical motor and about the housing of the electric motor and thereafter radially outwardly between the heat shield and the inducer blower housing to cool the electric motor and the shaft end bearing nearest the inducer housing. In another form, the portion surrounding the motor may be eliminated.

32 Claims, 5 Drawing Sheets

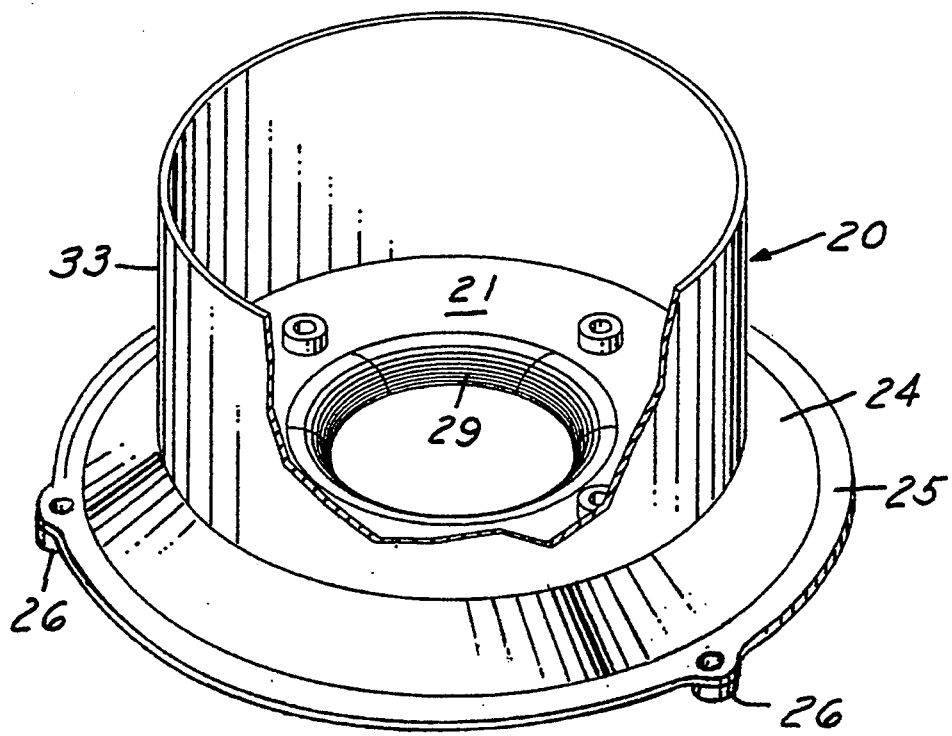
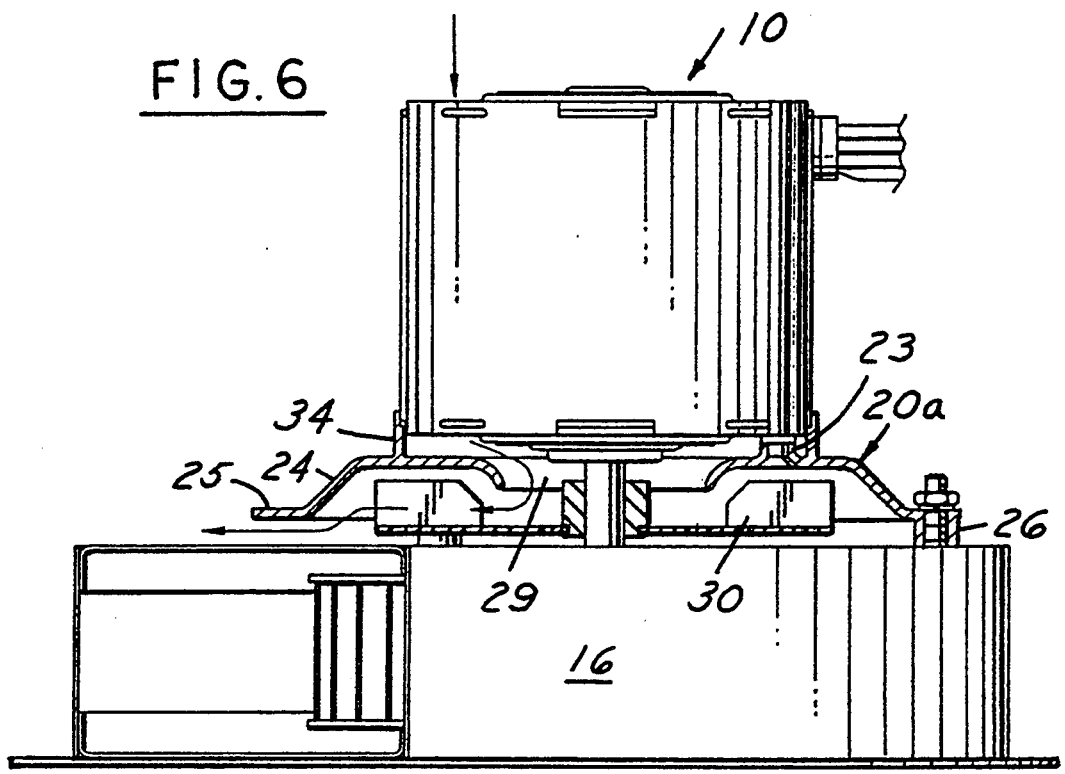

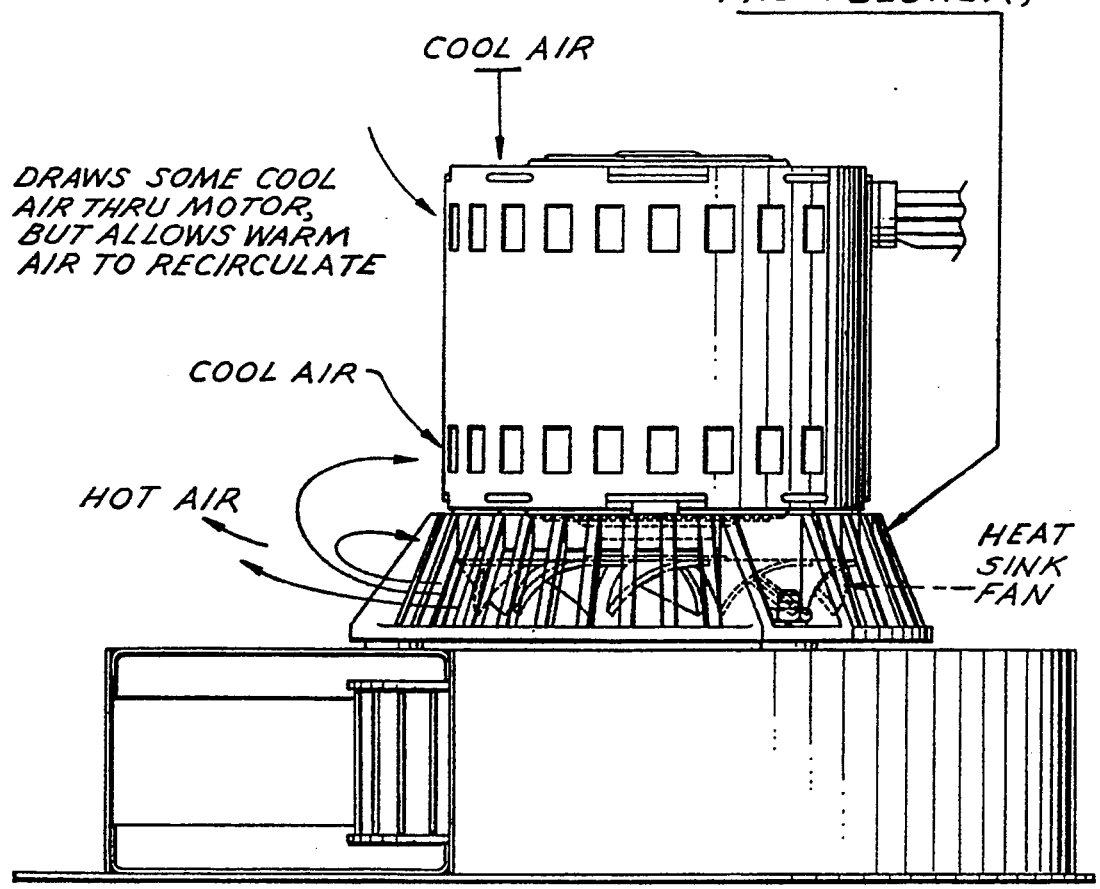

DRAFT INDUCER BLOWER MOTOR MOUNTING AND COOLING CONSTRUCTION

This is a continuation of copending application(s) Ser. No. 07/679,799 filed on Apr. 3, 1991, now abandoned.

This invention relates to draft inducer blower construction and particularly to the mounting of an electric motor on a draft inducer blower housing.

BACKGROUND AND SUMMARY OF THE INVENTION

In draft inducer blowers such as utilized in connection with furnaces and the like, it is common to provide a draft inducer including a housing and a blower wheel that is driven by an electric motor mounted on the housing and having a shaft providing a driving connection with the blower wheel within the draft inducer housing.

Most medium efficiency home furnaces (78% to 84% rated efficiency) use such draft inducer blowers to draw the combustion air through the heat exchanger and force it up the chimney. These blowers are typically handling air temperatures in the range of 400 to 450 degrees Fahrenheit. The blower housings and wheels are typically metal to handle these temperatures.

When the blower motor is mounted directly to the blower housing, the motor bearing closest to the blower housing (hereafter called the shaft-end bearing) is exposed to an excessive amount of heat both radiated from the surface of the blower housing and conducted through the motor mounting means and through the shaft of the motor. To prevent lubrication failure and extend motor life, bearing temperatures must be carefully controlled.

In an effort to minimize the heat radiated and conducted from the blower, it is common to space the electric motor away from the blower housing and add a fan blade to the motor shaft between the motor and blower. The fan blade introduces air movement through the motor and across the surface of the housing, while at the same time acting as a heat sink to remove heat conducted through the motor shaft to the shaft-end bearing. A guard is then required to prevent persons from touching the otherwise exposed fan blade.

Such a system is only marginal in controlling shaft-end bearing temperatures and unacceptable motor life is sometimes experienced. Cool air is drawn through the motor and hot air is thrown radially from the fan blade, but the hot air recirculates around the shaft end of the motor and reduces the effectiveness of the system.

Among the objectives of the present invention are to provide a draft inducer blower motor mounting including a heat shield/motor mount wherein air is directed both through and over the outside of the electric motor to cool the entire motor and especially the shaft-end bearing; wherein the heat shield/motor mount functions as a heat shield, isolating the motor from heat radiated from the surface of the blower housing; wherein the heat shield/motor mount functions to hold the electric motor to the blower housing without the need for additional construction; wherein the heat shield/motor mount covers the fan blade which is interposed between the electric motor and the draft inducer housing and protects against injury; and wherein the fan blade also acts as a heat sink to reduce heat transmitted through the motor shaft from the blower housing and functions to induce air flow to assist in cooling the electric motor.

In accordance with the invention, a draft inducer blower motor mounting and cooling construction comprising an electric motor including a housing having openings therein and a rotor mounted on a shaft, a fan blade fixed on the shaft and interposed between the motor and the draft inducer blower, and a heat shield interposed between the motor housing and the fan blade. The heat shield is fastened to the electric motor and to the housing of the inducer blower and has portions spaced from the blower housing. The heat shield preferably includes a portion surrounding at least a part of the motor housing such that rotation of the fan blade draws cooling air through the electrical motor and about the housing of the electric motor and thereafter radially outwardly between the heat shield and the inducer blower housing to cool the electric motor and the shaft end bearing nearest the inducer housing. In another form, the portion surrounding the motor housing is eliminated.

DESCRIPTION OF THE DRAWINGS

FIG. 5 is a perspective view of a heat shield and mounting member of FIG. 1.

FIG. 6 is a perspective view of a modified form of combined electric motor and draft inducer.

FIG. 10 is an elevational view of a prior art construction.

DESCRIPTION

Figure 1:
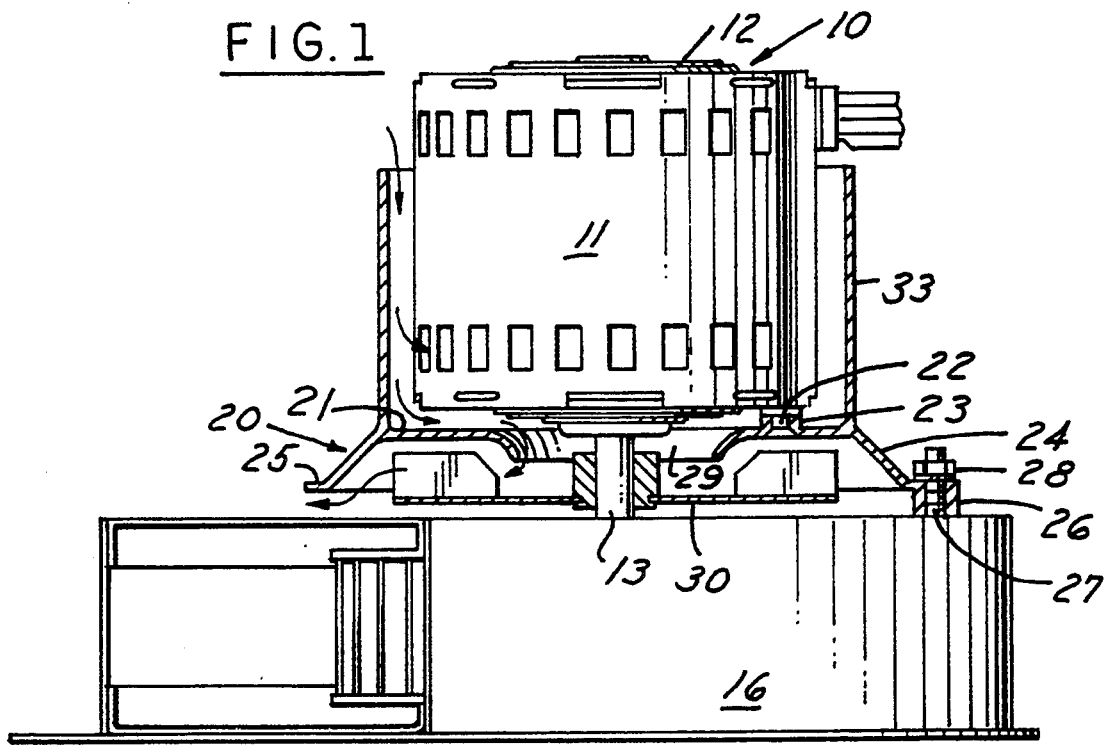
FIG. 1 is a part sectional elevational view of a combined electric motor and metallic draft inducer blower embodying the invention.
Figure 2:
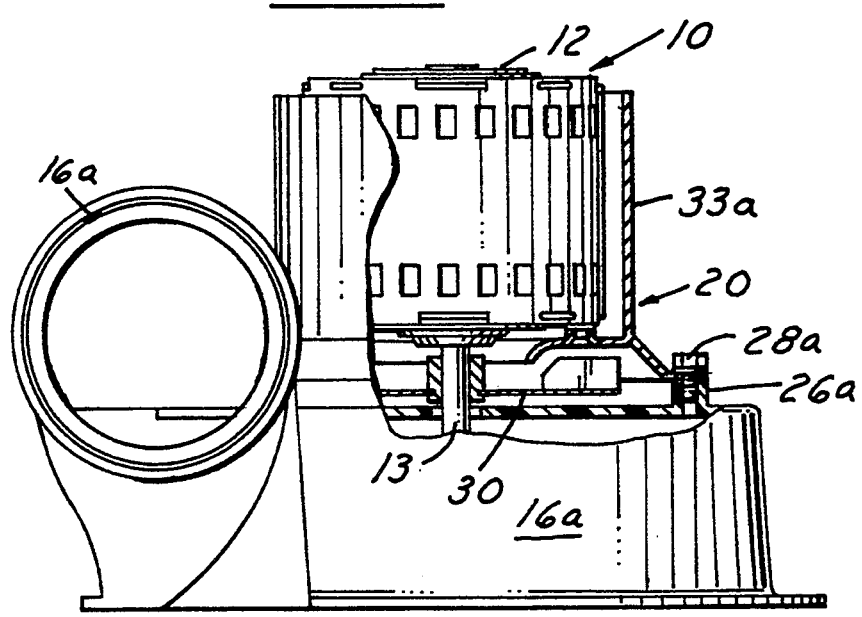
FIG. 2 is a part sectional elevational view of a combined electric motor and plastic draft inducer blower embodying the invention.
Figure 3:
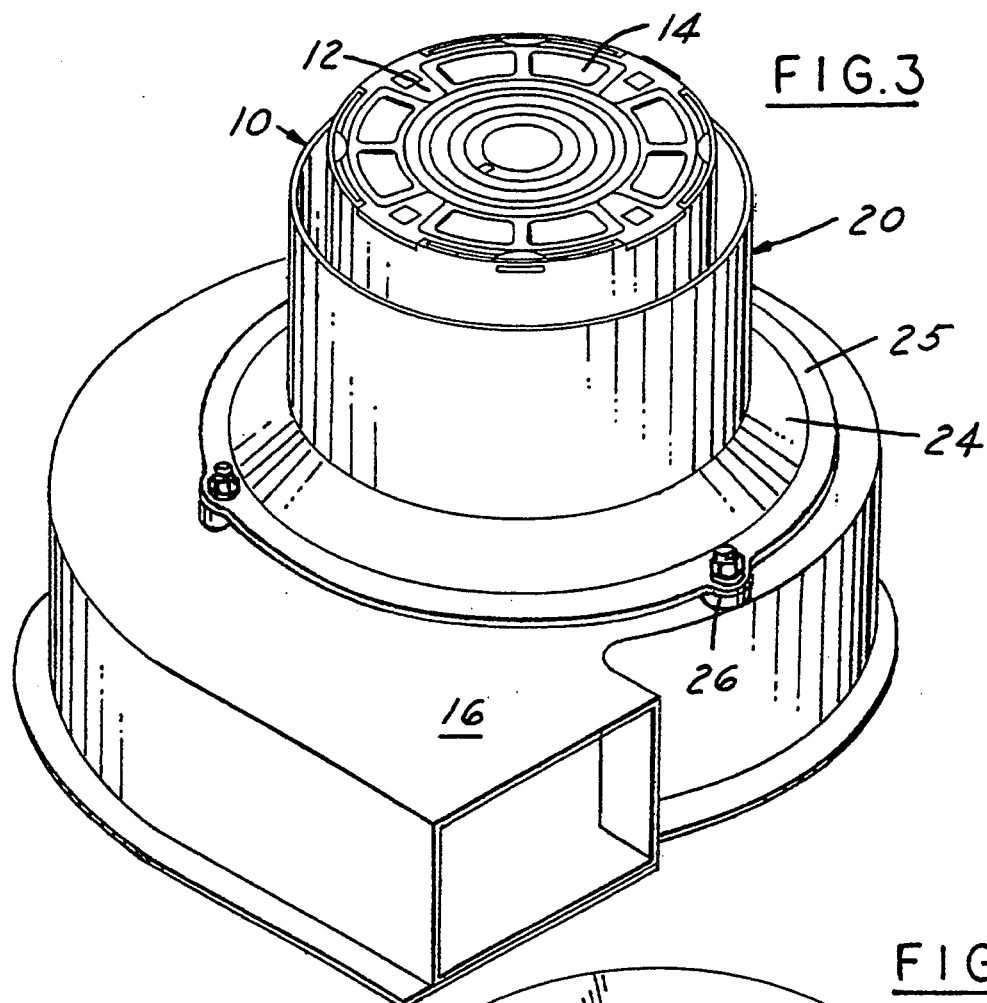
FIG. 3 is a perspective view of the form shown in FIG. 1.

Referring to FIGS. 1–7, there is shown a draft inducer blower motor mounting and cooling construction comprising an electric motor 10 having a housing 11 and end member 12 that is of conventional construction including a stator and a rotor with an output shaft 13, such as shown in U.S. Pat. No. 3,732,616 incorporated herein by reference. The end members 12 of the motor include axial openings 14 (FIG. 3). The shaft 13 of the electric motor is connected to a blower wheel 15 mounted thereon within a housing 16 of a draft inducer. When the draft inducer housing 16 is made of metal, it has the configuration shown in FIGS. 1 and 3. When the draft inducer housing is made of plastic, it has the configuration shown in FIGS. 2 and 4. A heat shield 20 made of metal or plastic is interposed between the electric motor 10 and the housing 16 and includes a transverse wall 21 on which the electric motor 10 is mounted by engagement of screws 22 through integral tubular spacers 23 on the transverse wall 21 and into threaded nuts on end member 12. The heat shield 20 further includes an integral inclined frustoconical wall 24 extending downwardly and radially away from the wall 21 to an integral radial peripheral flange 25.

Figure 4:
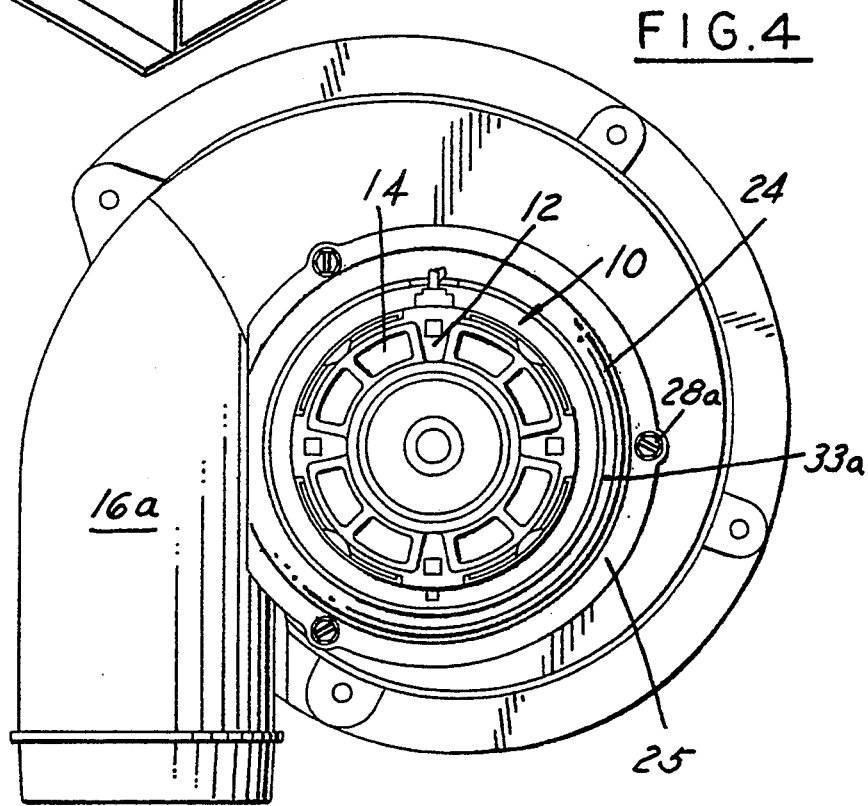
FIG. 4 is a plan view of the form shown in FIG. 2.
Figure 7:
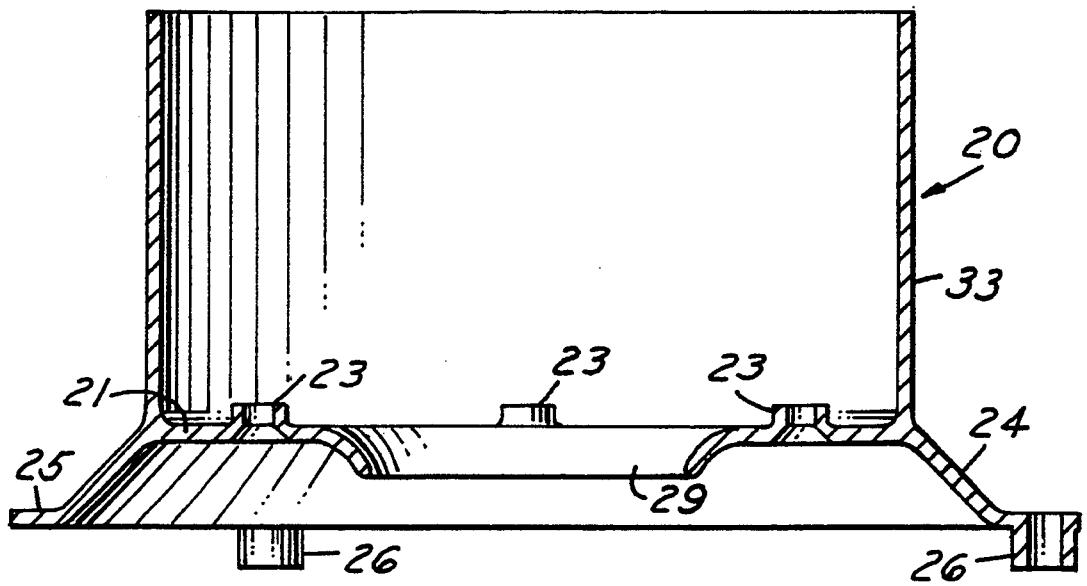
FIG. 7 is a transverse sectional view of the heat shield and mounting member shown in FIGS. 1, 3 and 5.

As shown in FIGS. 1 and 3, integral tubular spacers 26 extend axially downwardly from flange 24 and engages the housing 16. Threaded fasteners 27 on the housing 16 extend through the spacers 26 in the flange 24 and nuts 28 and threaded thereon to fasten the heat shield 20 and, in turn, support the electric motor 10 on the housing 16. Heat shield 20 also includes a central opening 29 in the wall 24 that has its inner edge tapered downwardly toward the housing 16.

Where the housing is made of plastic as in FIGS. 2 and 4, the integral spacers 26a extend axially upwardly from the plastic housing 16a and threaded fasteners 28a are threaded in the spacers 26a.

Figure 9:
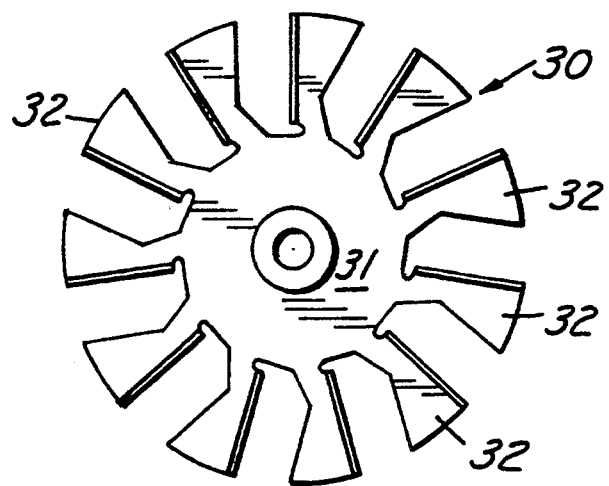
FIG. 9 is a bottom plan view of a fan blade.

A fan blade 30 made of metal such as aluminum or steel is fixed on the shaft 12 between the heat shield 20 and housing 16 and comprises a flat wall 30 and circumferentially spaced vanes 31 (FIG. 9) that function to draw air axially and directed radially outwardly against the inclined wall 24 and thereafter between the housing 16, as shown by the arrows, to cool the electric motor 10 by inducing flow through the motor 10 and about the periphery of the motor 10 and thereafter radially outwardly between the fan blade 30 and housing 16. As shown in FIGS. 1-4, in order to facilitate flow about the motor 10, an integral annular wall 33 on the heat shield 20 extends axially upwardly from the transverse wall 21 about at least a portion of the electric motor housing 11 (FIGS. 1 and 3) and preferably along the major portion of the housing 11 as shown in FIGS. 2 and 4 at 33a.

Comparative tests have indicated that the combination heat shield and motor mounting means cuts down on radiated heat and recirculated hot air and enhances the air flow pattern to improve shaft-end bearing cooling. Air is drawn not only through the motor 10, but also around the outside of the motor 10 and exhausted to reduce hot air recirculation. The shape of the shield 20 forms an effective heat shield to block radiated heat from the blower. This shield 20 is extended and formed down toward the housing so the opening meets UL safety guidelines.

Tests were conducted. A prior art stock unit such as shown in FIG. 10 was tested, then converted to a heat shield with a short annular wall and retested. After reviewing the results, the annular wall was extended up the sides of the motor to within ½ inch of the lead end and then retested. Results are as follows:

|  | S.E. BRG TEMP | O.S.E. BRG TEMP | FIELD TEMP (Top O.L.E.) |
| --- | --- | --- | --- |
| Stock Unit | 84 | 70 | 78 |
| Heat Shield | 75 | 67 | 71 |
| Extended | 69 | 61 | 66 |

All temperatures are in degrees Centigrade and were taken by thermocouple.

These tests showed the ambient temperature in the blower compartment of the furnace to be high, and by extending the heat shield, it was possible to draw cooler air through the louvered front panel of the furnace.

Figure 8:
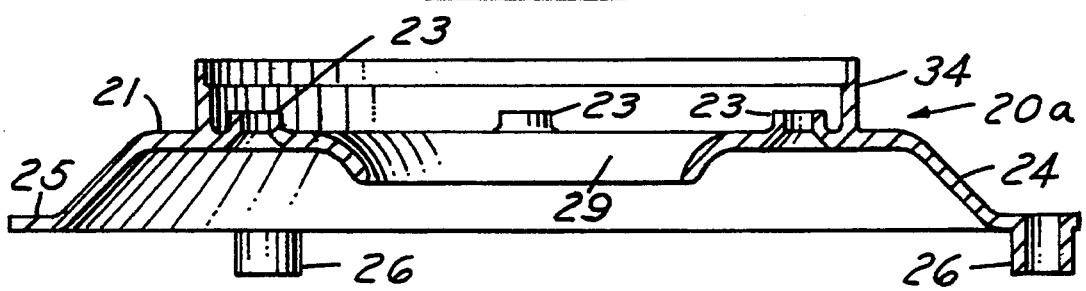
FIG. 8 is a transverse sectional view of the heat shield and mounting member shown in FIG. 6.

Improved results may be also obtained where a modified heat shield 20a is used as shown in FIGS. 6 and 8. In this form, the heat shield 20a includes a small stepped or shouldered axially extending circumferential flange 34 that engages the wall 11 of the electric motor 10. In all other respects, the spacer 20a is identical to that described above.

It can thus be seen that there has been provided a draft inducer blower motor mounting end including construction wherein air is directed both through and over the outside of the electric motor to cool the entire motor and especially the shaft-end bearing; wherein the heat shield/motor mount functions as a heat shield, isolating the motor from heat radiated from the surface of the blower housing; wherein the heat shield/motor mount functions to hold the electric motor to the blower housing without the need for additional construction; wherein the heat shield/motor mount covers the fan blade which is interposed between the electric motor and the draft inducer housing and protects against injury; and wherein the fan blade also acts as a heat sink to reduce heat transmitted through the motor shaft from the blower housing and functions to induce air flow to assist in cooling the electric motor.

I claim:

1. A draft inducer blower motor mounting and cooling construction comprising
    a blower housing,
    an electric motor including a motor housing having top and bottom end members with openings therein and a rotor mounted on a shaft,
    a fan blade fixed on the shaft and interposed between the motor and the blower housing,
    a blower wheel fixed on the shaft of the electric motor within the blower housing,
    a heat shield interposed between the bottom end of the motor housing and the fan blade,
    said electric motor having a bearing adjacent said blower housing,
    first spacer means for spacing said heat shield with respect to the electric motor housing, and second spacer means for spacing said heat shield with respect to the blower housing, said heat shield having a transverse wall portion with an opening therein spaced from the blower housing and the motor housing to define a substantially sinuous path therebetween, said first spacer means being positioned on the transverse wall portion, said heat shield including a tapered wall spaced from said blower housing, said second spacer means being positioned on the tapered wall, said electric motor, motor shaft and fan blade being constructed and arranged such that rotation of the fan blade draws cooling air through the openings in the top and bottom members of the electric motor housing and thereafter radially inwardly, downward through the opening in the portions of the heat shield, and outwardly between the heat shield and across the blower housing to cool the electric motor and said bearing adjacent the housing.

2. The draft inducer blower motor mounting and cooling construction set forth in claim 1 wherein said heat shield further includes a portion surrounding at least a part of the motor housing, said portion of said heat shield extending axially along a portion of the length of said electric motor housing to cause cooling air to be drawn by the fan blade between the portion and the electric motor as well as through the openings in the motor housing.

3. The draft inducer blower mounting and cooling construction set forth in claim 2 wherein said portion extends axially along a major portion of said electric motor housing.

4. The draft inducer blower motor mounting and cooling construction set forth in claim 1 wherein said heat shield comprises an integral body including said transverse wall and said tapered wall, and an integral radial wall, said second spacer means comprising tubular spacer means located on said integral radial wall for engaging the housing of said draft inducer.

5. The draft inducer blower motor mounting and cooling construction set forth in claim 1 wherein said heat shield includes a portion extending along at least a portion of the motor comprising a support wall extending axially with respect to the motor from the periphery of said transverse wall for engaging the motor housing,
said first spacer means comprising tubular spacer means located on said transverse wall between said support wall and the opening for engaging the motor housing.

6. The draft inducer blower motor housing and cooling construction set forth in claim 5 wherein said heat shield is made of metal.

7. The draft inducer blower motor housing set forth in claim 5 wherein said heat shield is made of plastic and includes integral spacers engaging the blower housing.

8. The draft inducer and blower housing set forth in claim 5 wherein said opening in said wall includes an edge tapered downwardly and axially toward the blower housing.

9. The draft inducer blower motor housing and cooling construction set forth in any one of claims 1-3 wherein said heat shield comprises an integral construction.

10. The draft inducer blower motor housing and cooling construction set forth in any one of claims 1-3 wherein said heat shield is made of plastic.

11. The draft inducer blower motor housing and cooling construction set forth in any one of claims 1-3 wherein said heat shield is made of metal.

12. For use in a draft inducer blower motor mounting and cooling construction comprising a blower housing, an electric motor including a motor housing having openings therein and a rotor mounted on a shaft, a blower wheel fixed on the shaft of the electric motor within the blower housing, said electric motor having a bearing adjacent said blower housing, a fan blade fixed on the shaft and interposed between the motor and the blower housing,
a heat shield interposed between the bottom end of the motor housing and the fan blade,
first spacer means for spacing said heat shield with respect to the electric motor housing, and a second spacer means for spacing said heat shield with respect to the blower housing such that portions of the heat shield are spaced from the blower housing, said heat shield having a transverse wall portion with an opening spaced from the blower housing and the motor housing to define a substantially sinuous path therebetween, said first spacer means being positioned on the transverse wall portion, said heat shield having a tapered wall spaced from said blower housing, said second spacer means being positioned on the tapered wall, said electric motor, motor shaft and fan blade are constructed and arranged such that when in position, rotation of the fan blade draws cooling air through the electric motor and thereafter radially outwardly between the heat shield and across the blower housing to cooling the electric motor and the bearing adjacent the blower housing.

13. The heat shield set forth in claim 12 wherein said heat shield includes a portion to surround at least a part of the motor housing, said portion of said heat shield extending axially along a portion of the length of said electric motor housing to cause cooling air to be drawn by the fan blade between the portion and the electric motor as well as through the openings in the motor housing.

14. The heat shield set forth in claim 13 wherein said portion is adapted to extend axially along a major portion of said electric motor housing.

15. The heat shield set forth in claim 12 wherein said heat shield is made of metal.

16. The heat shield set forth in claim 12 wherein said heat shield is made of plastic and includes integral spacers adapted to engage the blower housing.

17. The heat shield set forth in claim 12 including a portion extending along at least a portion of the motor comprising a support wall extending from the periphery of said transverse wall for engaging the motor housing,
said first spacer means comprising tubular spacer means located on said transverse wall between said support wall and the opening for engaging the motor housing.

18. The heat shield construction set forth in claim 12 wherein said heat shield comprises an integral body including said transverse wall and said tapered wall, and an integral flange wall, said first spacer means comprising tubular spacer means located on said transverse wall between said integral wall and the opening for engaging the motor housing and second means comprising tubular spacer means on said integral flange wall for engaging the housing of said draft inducer.

19. The heat shield set forth in any one of claims 12-14 wherein said heat shield is of integral construction.

20. The heat shield set forth in any one of claims 12-13 wherein said heat shield is made of plastic.

21. The heat shield set forth in any one of claims 12-13 wherein said heat shield is made of metal.

22. For use in a draft inducer blower motor mounting and cooling construction comprising a blower housing, an electric motor including a motor housing having openings therein and a rotor mounted on a shaft, a blower wheel fixed on the shaft of the electric motor within the blower housing, said electric motor having a bearing adjacent said blower housing, a fan blade fixed on the shaft and interposed between the motor and the blower housing,
a heat shield interposed between the bottom end of the motor housing and the fan blade,
first means for spacing said heat shield with respect to the electric motor housing, and second means for spacing said heat shield with respect to the blower housing, said heat shield comprising a transverse wall having an opening, said transverse wall including a tapered wall extending downwardly and axially toward the blower housing, said heat shield being mounted on the blower housing by said second means, such that portions of the heat shield are spaced from the blower housing and the motor housing to define a substantially sinuous air path therebetween, said electric motor, motor shaft and fan blade are constructed and arranged such that when the heat shield is in position, and the fan blade actuated, cooling is drawn through the openings in the electric motor housing and thereafter radially inwardly, downward through the heat shield and downwardly between the heat shield and across the blower housing to cool the electric motor and the bearing adjacent the blower housing.

23. The heat shield set forth in claim 22 including a portion extending along at least a portion of the motor comprising a support wall extending from the periphery of said transverse wall for engaging the motor housing, said first means comprising tubular spacer means located on said transverse wall between said support wall and the opening for engaging the motor housing.

24. A draft inducer blower motor mounting and cooling construction set forth in claim 22 wherein said second means is located on said blower housing.

25. A draft inducer blower motor mounting and cooling construction set forth in claim 22 wherein said first means is located on said heat shield and said second means is located on said blower housing.

26. For use in a draft inducer blower motor mounting and cooling construction comprising a blower housing, an electric motor including a motor housing having openings therein and a rotor mounted on a shaft, a blower wheel fixed on the shaft of the electric motor within the blower housing, said electric motor having a bearing adjacent said blower housing, a fan blade fixed on the shaft and interposed between the motor and the blower housing, a heat shield interposed between the motor housing and the fan blade, said heat shield being fastened to the electric motor housing and to the blower housing, first means for spacing said heat shield with respect to the electric motor housing, and second means for spacing said heat shield with respect to the blower housing, said heat shield comprising an integral body including a transverse wall having an opening through which the shaft of the electric motor extends, an integral wall extending radially and axially outwardly from said transverse wall, and an integral flange wall, said first means comprising tubular spacer means located on said transverse wall between said integral wall and the opening for engaging the motor housing and said second means comprising tubular spacer means on said integral flange wall for engaging the housing of said draft inducer, such that portions of the heat shield are spaced from the blower housing and the motor housing to define a substantially sinuous air path therebetween, so that when in position, rotation of the fan blade draws cooling air through the electric motor and thereafter radially outwardly between the heat shield and across the blower housing to cool the electric motor and the bearing adjacent the blower housing.

27. A draft inducer blower motor mounting and cooling construction comprising a blower housing including a wall having an opening,
an electric motor including a motor housing having top and bottom end members with openings therein and a rotor mounted on a shaft,
a fan blade fixed on the shaft and interposed between the motor and the blower housing,
said shaft extending through the opening in the wall of the blower housing,
a blower wheel fixed on the shaft of the electric motor within the blower housing,
a heat shield interposed between the bottom end of the motor housing and the fan blade adjacent to and spaced from the wall of the blower housing to define a substantially sinous path therebetween,
said electric motor having a bearing adjcent said blower housing,
first spacer means for spacing said heat shield in close proximity with respect to the electric motor housing, and second spacer means for spacing said heat shield in close proximity with respect to the blower housing, said heat shield having a transverse wall portion in close proximity with an opening therein spaced from the blower housing and the motor housing to define a substantially sinuous path therebetween, said electric motor, motor shaft and fan blade being constructed and arranged such that rotation of the fan blade draws cooling air through the openings in the top and bottom members of the electric motor housing and thereafter radially inwardly, downward through the opening in the heat shield, and radially outwardly between the heat shield and across the wall of the blower housing to cool the electric motor and said bearing adjacent the housing,
said heat shield comprising an integral body including said transverse wall, said flange wall comprising a tapered wall, and an integral radial flange.

28. The draft inducer and blower mounting and cooling construction set forth in claim 27 including a portion extending along at least a portion of the motor comprising a wall extending from the periphery of said transverse wall.

29. The draft inducer and blower mounting and cooling construction set forth in claim 28 wherein said second spacer means comprises integral tubular spacer means on said radial flange.

30. For use in a draft inducer blower motor mounting and cooling construction comprising a blower housing including a wall having an opening, an electric motor including a motor housing having openings therein and a rotor mounted on a shaft, a blower wheel fixed on a shaft of the electric motor within the blower housing, said electric motor having a bearing adjacent said blower housing, a fan blade fixed on the shaft and interposed between the motor and the blower housing, said shaft extending through the opening in the wall of the blower housing,
a heat shield interposed between the bottom end of the motor housing and the fan blade adjacent to and spaced from the wall of the blower housing to define a substantially sinuous path therebetween,
said heat shield having a transverse wall portion with an opening spaced from the blower housing and spaced from the motor housing,
first spacer means for spacing said heat shield in close proximity with respect to the electric motor housing, and a second spacer means for spacing said heat shield in close proximity with respect to the blower housing such that portions of the heat shield are spaced from the blower housing,
said first spacer means being positioned on the transverse wall portion, said electric motor, motor shaft and fan blade being constructed and arranged such that when in position, rotation of the fan blade draws cooling air through the electric motor and thereafter radially inwardly through the opening in the heat shield and thereafter radially outwardly between the heat shield and across the wall of the blower housing to cool the electric motor and the bearing adjacent the blower housing, said heat shield comprising an integral body including said transverse wall, a tapered wall, and an integral radial flange.

31. The heat shield set forth in claim 30 including a portion extending along at least a portion of the motor comprising a wall extending from the periphery of said transverse wall.

32. The heat shield set forth in claim 31 wherein said second spacer means comprises integral tubular spacer means on said radial flange.

* * * * *